(12) United States Patent
Guillot et al.

(10) Patent No.: US 8,537,727 B2
(45) Date of Patent: Sep. 17, 2013

(54) AVIONIC SYSTEM COMPRISING A CONTROLLER AND AT LEAST ONE PERIPHERAL THAT ARE LINKED BY A LINE MUTUALIZED FOR POWER AND DATA

(75) Inventors: François Guillot, Paris (FR); Jean-Marie Courteille, Paris (FR)

(73) Assignee: Sagem Defense Securite, Paris (FR)

( * ) Notice: Subject to any disclaimer, the term of this patent is extended or adjusted under 35 U.S.C. 154(b) by 155 days.

(21) Appl. No.: 13/123,893

(22) PCT Filed: Oct. 13, 2009

(86) PCT No.: PCT/EP2009/063344
§ 371 (c)(1),
(2), (4) Date: Apr. 12, 2011

(87) PCT Pub. No.: WO2010/043613
PCT Pub. Date: Apr. 22, 2010

(65) Prior Publication Data
US 2011/0199943 A1    Aug. 18, 2011

(30) Foreign Application Priority Data

Oct. 13, 2008   (FR) ...................................... 08 56924

(51) Int. Cl.
*H04B 1/44* (2006.01)
(52) U.S. Cl.
USPC .......................................... 370/282; 340/538
(58) Field of Classification Search
USPC ............ 370/276, 278, 282; 340/538, 538.11, 340/538.12, 538.13, 538.14, 538.15, 12.31–12.4
See application file for complete search history.

(56) References Cited

U.S. PATENT DOCUMENTS

| | | | |
|---|---|---|---|
| 5,210,519 A | 5/1993 | Moore | |
| 5,777,769 A | 7/1998 | Coutinho | |
| 5,822,373 A * | 10/1998 | Addy | ............................ 375/259 |
| 6,192,069 B1 | 2/2001 | Kubinec | |
| 2004/0070912 A1 | 4/2004 | Kopp | |
| 2004/0258141 A1 | 12/2004 | Tustison et al. | |

FOREIGN PATENT DOCUMENTS

EP    1 134 909 A1    9/2001

* cited by examiner

*Primary Examiner* — Gary Mui
(74) *Attorney, Agent, or Firm* — Blakely, Sokoloff, Taylor & Zafman

(57) ABSTRACT

According to a first aspect the invention relates to a device forming a central controller (C) intended to be linked to a remote peripheral ($P_1$-$P_N$) by way an electrical power line (L), comprising a power transmitter (1) and a low-pass litter ($C_{C\_BF}$) arranged between the power transmitter and the electrical line, as well as means for transmitting/receiving data (3) in baseband and a high-pass filter ($C_{C\_HF}$) arranged between the data transmission/reception means and the electrical line, the electrical line being of the kind mutualized for the transmission of power at low frequency from the central controller to the remote peripheral and for the simultaneous bidirectional transmission of data in baseband at high frequency between the central controller and the remote peripheral. The invention also relates to a remote peripheral ($P_1$-$P_N$) as well as to the system comprising a central control linked to one or more remote peripherals by an electrical line mutualized for the transmission of power and of bidirectional data simultaneously.

21 Claims, 5 Drawing Sheets

AVIONIC SYSTEM COMPRISING A CONTROLLER AND AT LEAST ONE PERIPHERAL THAT ARE LINKED BY A LINE MUTUALIZED FOR POWER AND DATA

This is a non-provisional application claiming the benefit of International application number PCT/EP2009/063344 filed Oct. 13, 2009.

The field of the invention is that of avionic equipment. More specifically, the invention relates to avionic systems comprising a central controller and one or more remote peripheral equipment that are linked to the central controller by way of an electrical power line.

Avionic systems today comprise remote peripherals of more and more intelligent sensor or actuator type. They involve in particular critical flight control equipment, for example electric actuators, which are not only controlled by the central controller but also able to elaborate reports intended for the central controller.

A simultaneous bidirectional communication channel ("full duplex") between the central controller and a remote peripheral then proves to be necessary on the one hand so that the central controller can transmit its orders and instructions to the remote peripheral and on the other hand so that the peripheral can feed back its reports to the central controller.

The exchanges of data are typically of the order of 10 000 samples per second, such that a pass band of the order of 100 kbits to 1 Mbits proves to be necessary. It will be noted that the requirements in terms of pass band are more particularly high when the peripheral forms with the central controller a servo loop.

It is thus wished on the one hand to supply with electrical power a remote peripheral (typically several kW) and on the other hand to ensure a simultaneous bidirectional communication channel with a remote peripheral up to 50 m typically) with a delivery rate of useful information of 1 Mbits/s.

Moreover, such an avionic system is intended to be used in a composite aeroplane environment that has specific constraints, particularly as regards the design of the on-board electronic components (compliance with the DO254 standard).

Thus, to ensure a 1500V insulation meeting lightning constraints, it proves to be necessary to place a high impedance path against the passages of induced currents. Furthermore, Electro Magnetic Compatibility (EMC) constraints impose that the EMC referential is not to the metallic earth, at least for the low frequency components.

A technology known as on-line carrier currents (CPL) is known which makes it possible to mutualize a single bifilar line for the transmission of power and bidirectional data. According to this technology, the digital information is modulated and superimposed on the electrical signal so as to be able to pass via the electrical lines.

CPL technology is nevertheless very polluting in terms of radiation and consequently incompatible with the EMC constraints of an aeroplane environment. The DO254 justification of complex commercial components (COTS components: Commercial Off The Shelf) is moreover very difficult to achieve.

CPL technology thus proves to be unsuitable for use in an avionic system.

The fact remains that it would be judicious to be able to use the electrical power line of an avionic system both to supply the peripheral(s) with electrical power and to carry data transiting in simultaneous bidirectional mode between the controller and the peripheral(s), while at the same time complying with the constraints specific to the environment in which this system is intended to be used.

The objective of the invention is to respond to this need and proposes to this end, according to a first aspect, a device forming a central controller intended to be linked to a remote peripheral by way of an electrical power line, comprising a power transmitter and a low-pass filter arranged between the power transmitter and the electrical line, as well as means for transmitting/receiving data in baseband and a high-pass filter arranged between the data transmission/reception means and the electrical line, the electrical line being of the kind mutualized for the transmission of low frequency power from the central controller to the remote peripheral and for the simultaneous bidirectional transmission of data in baseband at high frequency between the central controller and the remote peripheral.

According to a second aspect, the invention proposes a device forming a remote peripheral intended to be linked to a central controller by way of an electrical power line, comprising a power receiver and a low-pass filter arranged between the power receiver and the electrical line, as well as means transmitting/receiving data in baseband and a high-pass filter arranged between the data transmission/reception means and the electrical line, the electrical line being of the kind mutualized for the transmission of power at low frequency from the central controller to the remote peripheral and for the simultaneous bidirectional transmission of data in baseband at high frequency between the central controller and the remote peripheral.

Certain preferred, but non limiting, aspects of the device according to the first or the second aspects of the invention are as follows:
- the data transmission/reception means comprise a differential amplifier able to discriminate, among the data transiting on the electrical line, the data transmitted locally from the data to be received;
- the differential amplifier receives on the one hand the data transiting on the line through a transformer and on the other hand the data transmitted locally through a gain attenuator and a retarder;
- the data to be received discriminated by the differential amplifier flows through a reception circuit comprising a hysterisis comparator able to reconstitute the binary states of the message received;
- the reception circuit moreover comprises means of regeneration of the clock of the message received;
- the data transmitted locally flows through a transmission path comprising a high-pass filter receiving the data to be transmitted in the form of a binary signal and adapted to ensure a zero average component to these data;
- the transmission path of the central controller moreover comprises a resistance of value equal to a characteristic impedance of the electrical line;
- the transmission path of a remote peripheral moreover comprises a voltage/current converter having a quasi-infinite output impedance;
- the transmission/reception means are configured to transmit the data in baseband according to NRZ coding;
- the transmission/reception means are configured to implement scrambling and self-correcting functions;
- the transmission/reception means of a device forming a central controller are configured to transmit data for the attention of a remote peripheral in a time interval dedicated to the peripheral;
- the transmission/reception means of a device forming a central controller are configured to receive data coming from a remote peripheral in the same time interval as that dedicated for the transmission of data for the attention of said remote peripheral;

the transmission/reception means of a device forming a remote peripheral are configured to receive data coming from a central controller in a time interval dedicated by the central controller to the peripheral;

the transmission/reception means of a device forming a remote peripheral are configured to transmit data for the attention of the central controller in the same time interval as that dedicated for the reception of data from said central controller.

According to another aspect, the invention relates to a system comprising a device forming a central controller according to the first aspect of the invention linked by way of an electrical power line to one or more devices forming a remote peripheral according to the second aspect of the invention.

Other aspects, aims and advantages of the present invention will become clearer on reading the following detailed description of preferred embodiments thereof, given by way of non limiting example, and by referring to the appended drawings in which.

Figure 1:
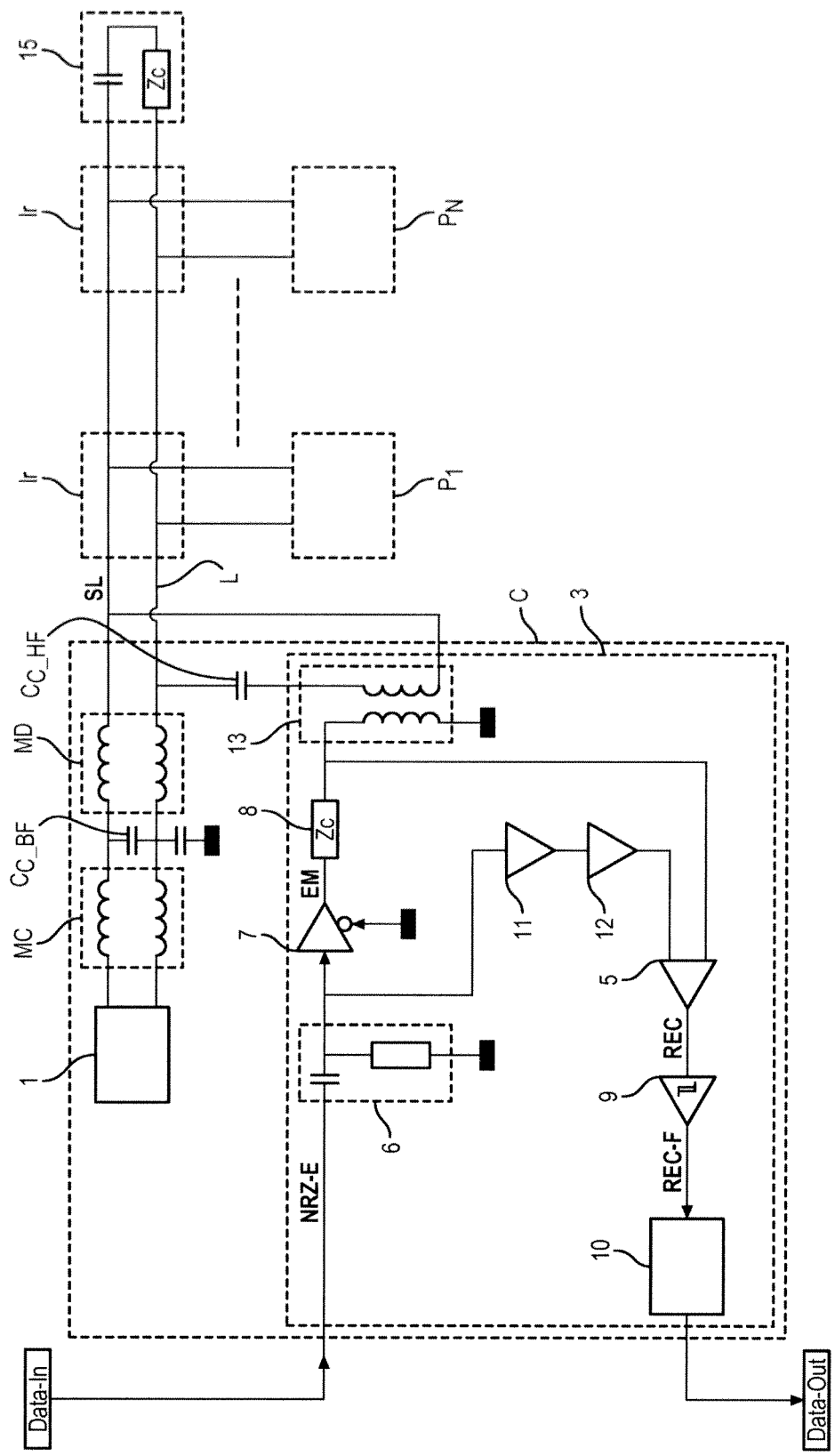
FIG. 1 illustrates a possible embodiment of a central controller according to the invention.

With reference to FIG. 1, a central controller C is represented linked by way of an electrical power line L, typically a bifilar line, to one or more peripherals $P_1$-$P_N$.

The dimensioning of the line L is made firstly by its low frequency characteristics and its capacity to withstand high voltages and important currents. Cabling constraints may moreover impose that the two conductors are associated in the form of a twisted pair, not necessarily shielded, realising an iterative impedance of known value, typically between 50 and 300 ohms.

More precisely, a peripheral $P_1$-$P_N$ is linked to the electrical line L via a connection interface Ir.

The central controller C comprises a DC or AC power transmitter 1, preferentially insulated to comply with aircraft constructor recommendations as regards resistance to the effects of lightning.

As will be detailed hereafter, the central controller C realises:

the supply of the line, for example with high level continuous voltage (for example ±270 V), for the transmission of power to the remote peripherals;

a high frequency coupling for the transmission of bidirectional binary information.

The segregation of the power supply vis-à-vis communication signals is ensured by a $C_{C\_BF}$ capacitor making it possible to ensure a low impedance path to the high frequency signals, to which may be added impedances in series in the transmission line (common mode (CM) and differential mode (DM) inductance for the high frequency components), as well as a galvanic insulation of the power transmitter 1 for the low frequency components.

The segregation of the communication signals vis-à-vis the supply voltages is for its part achieved by a high-pass filtering ($C_{C\_HF}$ capacitor).

The central controller may comprise Common Mode CM filtering inductances having for role of increasing the common mode series impedance of the line L vis-à-vis perturbations transmitted (by the power transmitter 1) or received by the line itself. The CM inductances may be of high value, thus of quite high resulting impedance, which is of favourable contribution to meeting CEM constraints (susceptibility and transmission).

The central controller may comprise Differential Mode DM inductances having for role of increasing the impedance of the line L in differential mode with regard to the high frequency components coming from the power transmitter 1. The final objective, in addition to the overall improvement vis-à-vis EMC compatibility, is to limit as far as possible the noise level transmitted on the line L, the latter degrading the signal to noise ratio of the message received and being thus harmful to the good reception capacity of the bits transmitted by the line.

The central controller C comprises a low-pass filter arranged between the power transmitter 1 and the electrical line L.

The central controller C moreover comprises means of transmitting/receiving data in baseband 3 as well as a high-pass filter arranged between the data transmission/reception means and the electrical line L.

According to a possible embodiment of the invention represented in FIG. 1, the high-pass filter is thus formed by the $C_{C\_HF}$ capacitor (in low frequency the $C_{C\_HF}$ capacitor acts as an open switch), whereas the low-pass filter is formed by the $C_{C\_BF}$ capacitor (in high frequency the $C_{C\_BF}$ capacitor acts as a closed switch thereby forming a short-circuit).

Figure 2:
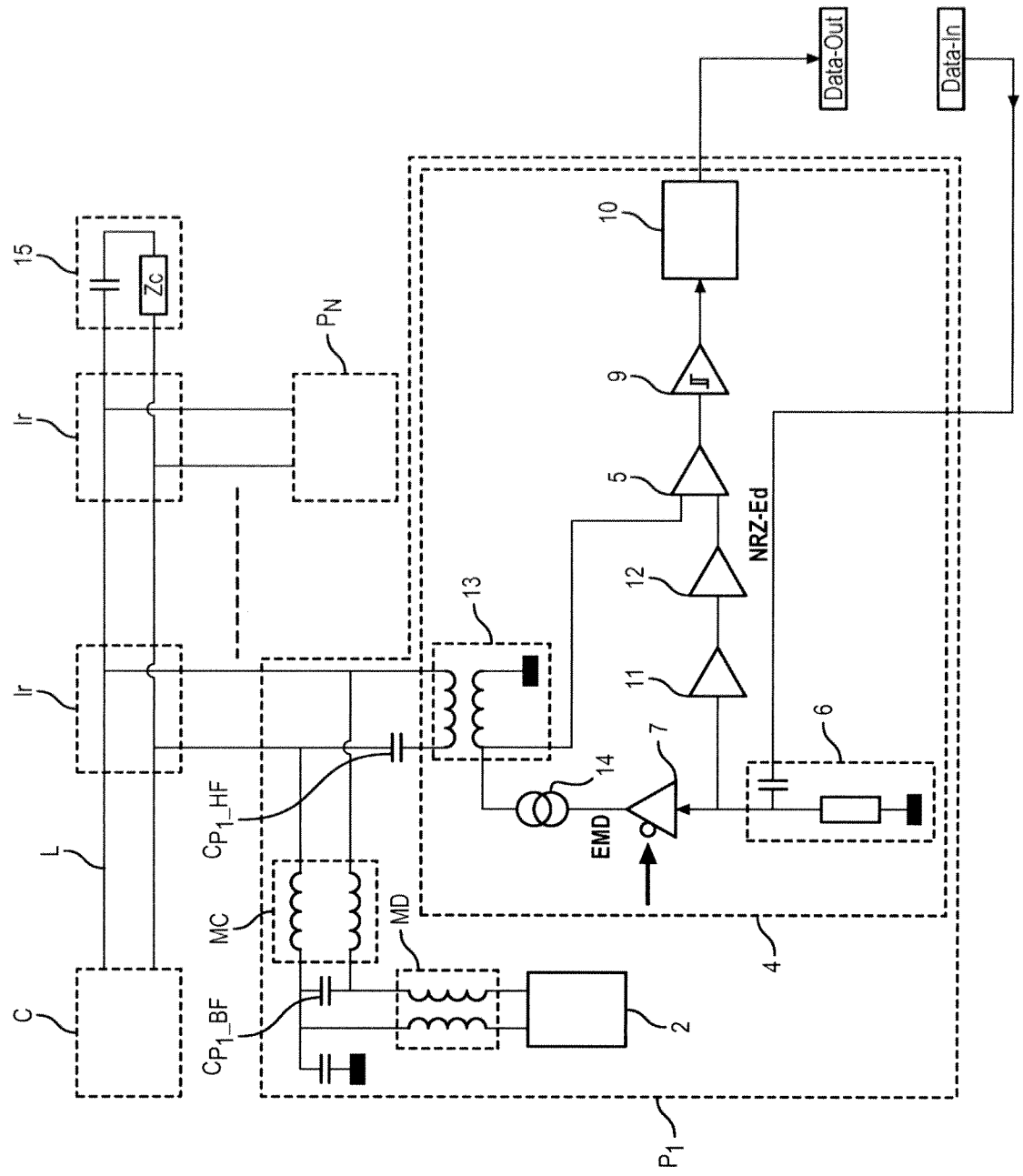
FIG. 2 illustrates a possible embodiment of a remote peripheral according to the invention.

In FIG. 2 is represented a possible embodiment of a remote peripheral $P_1$ according to the invention. The peripheral $P_1$ comprises a power receiver 2, preferentially insulated to comply with aircraft constructor recommendations as regards resistance to the effects of lightning.

The peripheral $P_1$ comprises a low-pass filter arranged between the power receiver 2 and the electrical line L.

The peripheral $P_1$ moreover comprises means for transmitting/receiving data in baseband 4 as well as a high-pass filter arranged between the data transmission/reception means and the electrical line L.

According to a possible embodiment of the invention represented in FIG. 2, the high-pass filter is thus formed by the $C_{C\_BF}$ capacitor (in low frequency the $C_{C\_HF}$ capacitor acts as an open switch), whereas the low-pass filter is formed by the $C_{C\_BF}$ capacitor {in high frequency the $C_{C\_BF}$ capacitor acts as a closed switch thereby forming a short-circuit).

Thus, within the scope of the invention, the supply voltage is separated from the data by means of passive high-pass and low-pass filters. The electrical power line L is thus mutualized for the transmission of power from the central controller to one or more remote peripherals and the simultaneous bidirectional transmission of data in baseband between the central controller and the remote peripheral(s).

The means of transmitting/receiving data in baseband 3 of the 10 central controller C and the means of transmitting/receiving data in baseband 4 of the remote peripheral $P_1$ are each configured to transmit "Data-in" data and to receive "Data-Out" data.

The transmission/reception means 3, 4 thus make it possible to realise the addition of two binary streams to the supply voltage on a unique electrical power line (an up stream corresponding to the data transmitted by the remote $P_1$-$P_N$ peripheral(s) to the central controller C; a down stream corresponding to the data transmitted by the controller C to the remote $P_1$-$P_N$ peripheral(s))

Preferentially, the transmission/reception means 3, 4 are configured to transmit the data in baseband according to NRZ coding.

Figure 3:
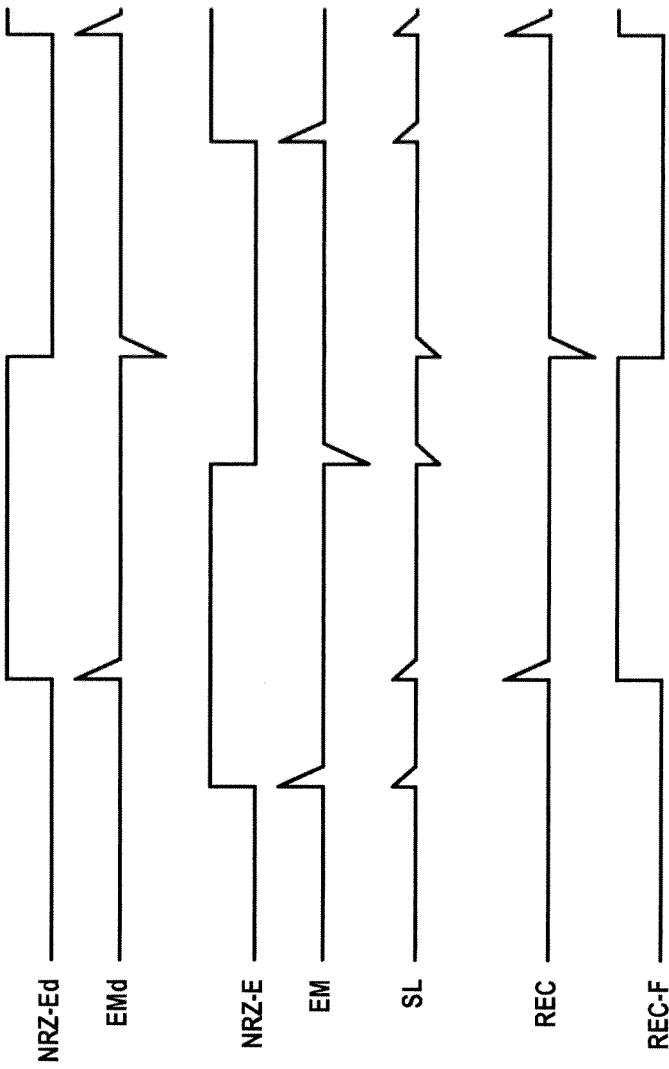
FIG. 3 represents chronograms corresponding to the different signals reported in FIGS. 1 and 2.

As represented in FIGS. 1 to 3, the transmission/reception means 3 of the controller C are configured to transmit a binary "NRZ-E" message whereas the transmission/reception means 4 of the peripheral P1 are configured to transmit a binary "NRZ-Ed" message.

The remainder of the description relates to a possible embodiment of the transmission/reception means 3 of the controller C. It will be understood that this description also applies to the transmission/reception means 4 of a remote peripheral P1. In this respect, similar elements bear the same references in FIGS. 1 and 2.

Transmission of Data

The digital data to transmit "NRZ-E" flow through a transmission circuit.

Preferentially, the transmission circuit comprises a high-pass filter 6 which receives the data to be transmitted "NRZ-E" in the form of a binary signal in RZ format, which ensure a zero average component to these data, and which transmits the states of the binary message in NRZ format. The resulting signal is represented under the label "EM" in FIGS. 1 and 3.

Similarly, the transmission/reception means 4 of the peripheral $P_1$ comprise a high-pass filter 6 to transmit the binary message "NRZ-Ed" in the form of an "EMd" message represented in FIG. 3.

Returning to the description of the transmission/reception means 3 of the central controller C, the resulting "EM" signal is transmitted on the electrical line L through a resistance 8 of value equal to the characteristic impedance Zc of the electrical line L, then through a transformer 13.

As regards the transmission/reception means 4 of the remote peripheral, the "EMd" signal is transmitted on the electrical line L through a voltage/current converter 14 having a quasi-infinite output impedance in order not to degrade the adaptation of the line, then through a transformer 13.

It will be remembered that the transformer 13 makes it possible to ensure an insulation and securement function vis-à-vis lightning constraints.

As represented in FIGS. 1 and 2, the electrical line L comprises an adaptation anti-resonance circuit 15. The anti-resonance circuit 15 and the resistance 8 of the central controller C make it possible, considering also that the peripherals do not degrade the adaptation of the line L, to adapt the electrical line L at each of its ends on its characteristic impedance Zc.

As a variant to the presence of the adaptation resistance 8 in the transmission/reception means 3 of the central controller C, it will be recalled that an anti-resonance circuit may be provided within the central controller.

The transmission circuit of the central controller C or the peripheral P1 may moreover comprise, downstream of the high-pass filter 6, a transmission amplifier 7 having a very low output resistance (considered as quasi-zero). In such a way, the output voltage only comprises the message transmitted locally.

Reception of Data

The SL data transiting on the electrical line correspond to the EM signal transmitted by the central controller and to the EMd signal (or to the signals) transmitted by the peripheral(s) P1(-PN). A simultaneous bidirectional transmission is thus realised on the electrical line L.

FIG. 3 represents such a SL signal corresponding to the addition of two streams, EM (down stream) and EMd (up stream) on the line L.

The transmission/reception means 3 of the controller C comprise a high frequency differential amplifier 5 able to discriminate, among the SL data transiting on the electrical line L, the data transmitted locally (NRZ-E) from the data to be received (NRZ-Ed).

The differential amplifier 5 thus makes it possible to segregate the down stream from the up stream.

According to a preferential embodiment, the differential amplifier 5 receives on the one hand the SL signal transiting on the line L through the transformer 13, and on the other hand the signal transmitted (EM for the controller C, EMd for the peripheral P1) through an attenuator 11 and a retarder 12. The attenuator 11 makes it possible to carry out a level adaptation in order to adjust the gain of the signal transmitted as a function of the different attenuations of the line L. The retarder 12 for its part makes it possible to compensate the retard induced by the line L.

The up stream flux thus discriminated by the differential amplifier 5 flows through a reception circuit comprising an amplifying circuit and a hysterisis comparator 9 able to reconstitute the message transmitted by the peripheral. It will be noted that the hysterisis comparator 9 is also useful for clearing the message received of any "traces" of the signal transmitted not perfectly discriminated by the differential transformer 5.

Recovery of the Binary Message Received

The reception of the binary message received may be realised in a programmable logic circuit (FPGA).

The reception circuit moreover comprises means of regeneration 10 of the clock that has served for the constitution of the NRZ message.

These means of regeneration have for functions to create a "bit" clock and to sample the data received by means of the clock thus created at the moment of the best possible discrimination between logic level 1 and logic level 0.

According to a possible embodiment of the invention, these means of regeneration of the clock form a phase locked loop.

This phase locked loop may especially be formed digitally.

The REC-F signal at the output of the hysterisis comparator 9 is thus sampled by the rhythm elaborated by the means of regeneration of the clock 10, so as to be correctly restored on the "Data-Out" output.

Figure 4:
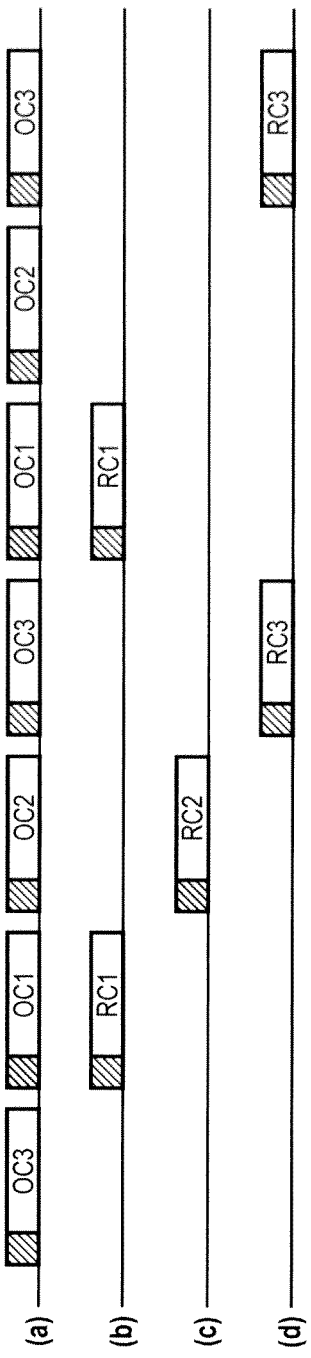
FIG. 4 illustrates a possible embodiment of exchanges of data between the central controller and the different peripherals to which it is linked.

FIG. 4 represents a possible embodiment of exchanges of data between the central controller and the different peripherals to which it is linked.

In this embodiment, the transmission/reception means 3 of the central controller are configured to transmit data for the attention of a remote peripheral in a time interval dedicated to the peripheral.

The line (a) represents in this respect the succession of the different data frames elaborated by the central controller (these frames are known as Master frames hereafter), each of these frames corresponds to the aggregation of an order for a given peripheral and a header comprising synchronisation and equalizing components. The reference OC3 thus corresponds to an order for the peripheral P3, the reference OC1 to an order for the peripheral P1, the reference OC2 to an order for the peripheral P2.

The transmission/reception means 4 of a peripheral P1-PN are for their part configured to transmit data for the attention of the central controller C in the time interval corresponding to that of the reception of an order coming from the central controller C. Thus, as appears on line (b) of FIG. 4, the peripheral P1 sends a frame (this frame is known as Coupler frame hereafter), corresponding to the aggregation of an RC1 message and a header comprising synchronisation and equalizing components, for the attention of the central controller uniquely in the time interval corresponding to the reception of an order OC1 from the central controller. The lines (c) and (d) illustrate for their part the sending of a frame by the peripherals P2 and P3 to the central controller, during the time intervals corresponding respectively to the reception of an order OC2 and OC3.

Figure 5:
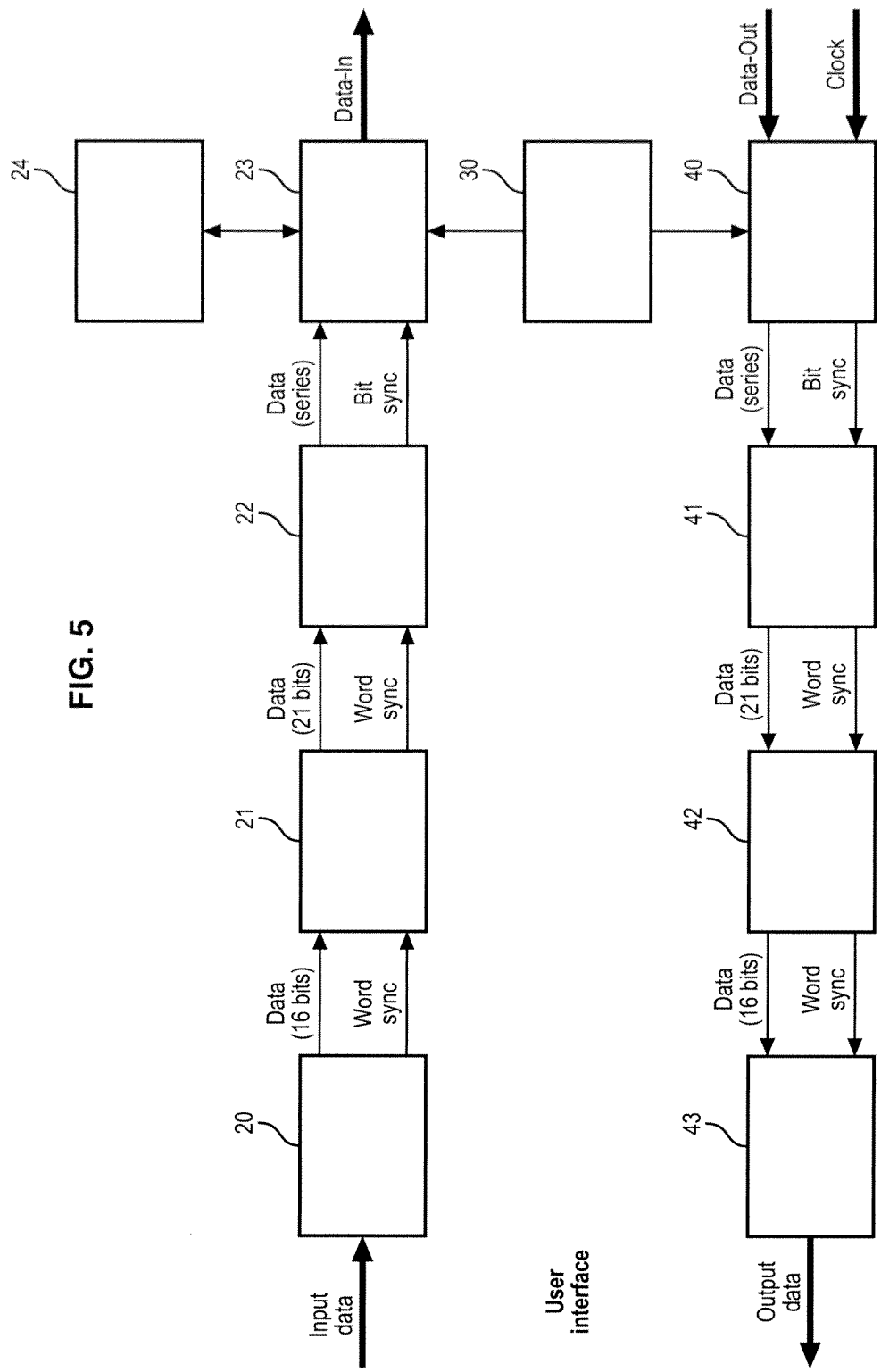
FIG. 5 represents a possible embodiment of a high level treatment realised on the input and output data.

With reference to FIG. 5, a possible embodiment will be detailed hereafter of a high level treatment carried out at the level of the central controller on the one hand on the input data to constitute the low level series "Data-in" data provided at the input of the transmission/reception means, and on the other hand on the low level series "Data-Out" data obtained at the output of the transmission/reception means to constitute the output data. It will be noted that the peripheral(s) carry out a similar high level treatment.

The development of the interface function of FIG. 5 for the low level layers treated by the transmission/reception means enable the system to stand up to different avionic protocols (ARINC 429, MIL 1553, TIP, etc.).

In particular, the electrical layer associated with the proprietary digital interface of the applicant may be customised to interface different avionic standards such as ARINC 429 or others. The solution proposed by the invention provides a perfectly deterministic digital information exchange support enabling the creation of virtual communication channels. For example, the central controller may provide an input and output interface for ARINC 429, and similarly for the remote peripheral concerned. Two conventional ARINC 429 equipments may be connected thereto and used in a totally transparent manner for them. It may be the same for other communication standards.

This interface function has moreover the advantage of being able to be implemented using standard programmable components (FPGA).

As represented in FIG. 5, the input data are subjected to the following operations, in succession. The input data are firstly treated by a block 20 able to split them into words of 16 bits and to add synchronisation components (a delimiter signal of the 16 bits word is thus transmitted by the block 20 to the block 21). At the block 21, 5 additional bits are generated corresponding to bits intended to enable the correction of errors, for example by implementing Hamming coding. At the block 22, a series of 21 bit words from the block 21 is stored and one thus constitutes a series of several words (the number of which is dependant on the parasite components present on the transmission line). Finally, they are retransmitted according to a pseudo random sequence (scrambling sequence) making it possible to spread out the series of errors at the moment of reception, thus increasing the efficiency of the self-corrector.

The block 30 is the generator of frames transmitted on the "Data-in" line. It generates a series of temporal spaces delimited by synchronisation patterns.

The block 23 regularly completes the temporal spaces by the data elaborated in the block 22.

The block 24 ensures for its part the temporary storage (in FIFO mode) of data transmitted by the block 22, in order to be able to adapt the asynchronisms of the two automatons (data and frame coming from the block 30). The differences of rhythms between the rate of data from the block 22 and the making available of temporal spaces is managed by the assignment to the latter of fill patterns in the event of absence of available data.

The block 30 also transmits synchronisation patterns to the block 40, enabling it to synchronise itself on the "Data-Out" input data.

The block 23 supplies at the output the Master frames in the form of series data in baseband, especially in NRZ format.

According to a possible embodiment of the invention, these series data in baseband are then filtered by a low-pass filter (not represented) making it possible to reduce the harmonics of the NRZ, before being sent to the transmission/reception means. The low-pass filter is for example of the $6^{th}$ order, with Bessel response to only assign a constant retard, the cut-off frequency of which is set at 0.7*Frequency Bits.

The "Data-Out" data obtained at the output of the transmission/reception means, as well as their regenerated clock, are for their part subjected to a block 40 forming reception interface for the Coupler frames, linked to the Master frame generation block 30, to extract the series data and the synchronisation bit. At the block 41, the synchronisation and the descrambling of data are carried out to reconstitute the 21 bit words. The latter are processed at the block 42 by application of self-correctors to reconstitute the 16 bit words corrected of errors. The block 43 forms a user interface making it possible to restore the high level data.

The invention moreover enables a better control of commutation parasites. The supply voltage(s) of the electrical power lines is (are) going to be used in order to drive for example motors or DC/DC chopping converters. These components generate parasites during commutations. In order to better control these parasites, the synchronisation of all the commutations with the communication clock may be realised by the controller C as well as by the peripherals $P_1(-P_N)$.

It is pointed out that the invention is not limited to a central controller or to a remote peripheral as described previously, but also extends to systems, especially an avionic system, comprising a controller linked to one or more remote peripherals by way of an electrical line mutualized for the transmission of power and bidirectional data, The advantages of this system are in particular the following:

A single bifilar line mutualized for transmission of power and bidirectional data (typically a shielded bifilar line, dimensioned principally by the service voltage and the intensity of the current to be passed, to which is added a physical geometry constraint: constant inter-conductor distance and uniform dielectric).

Shared lightning protections (by merging of lightning protections for the power and the signal).

Different possible communication standards (general purpose deterministic channel able to support different avionic standards with the addition of a digital interface overlayer).

Simultaneous bidirectional digital transmission (each stream is independent).

Minimisation of the spectral occupation (as opposed to multiple carrier transmission, due to the transmission in baseband, for example in NRZ, with spectrum limited by filtering).

Galvanic insulation of the data line (by coupling transformers).

Possibility of galvanic insulation of the power line (by the DC/DC or AC/DC converter placed in the central controller).

EMC and Lightning compatibility (concerning EMC, due to the minimisation of the spectrum occupied by the data transmitted: transmission in baseband—NRZ for example—and filtering, as well as due to not using High Frequency carrier or Multi Carrier, of COFDM type for example. Concerning lightning, due to the different galvanic insulations proposed).

DO254 justification possible, even for the most critical levels (all of the complex functions are effectively mastered, which makes the justification possible, as opposed to COTS components, the justifications of which are not provided by the constructors).

The invention claimed is:

1. Device forming a central controller (C) intended to be linked to a remote peripheral ($P_1$-$P_N$) by way of an electrical power line (L) of an avionic system, comprising a power transmitter (1) and a low-pass filter ($C_{C-BF}$) arranged between the power transmitter and the electrical line, characterised in that it comprises means for transmitting/receiving data (3) in baseband and a high-pass filter ($C_{C-HF}$) arranged between the data transmission/reception means and the electrical line, the electrical line being of the kind mutualized for the transmission of power at low frequency from the central controller to the remote peripheral and for the simultaneous bidirectional transmission of data in baseband at high frequency between the central controller and the remote peripheral, the data transmission/reception means (3, 4) comprising a differential amplifier (5) able to discriminate, among the data transiting on the electrical line, the data transmitted local (EM) from the data to be received (REC).

2. Device according to claim 1, wherein the amplifier receives on the one hand the data transiting on the line through a transformer (13) and on the other hand the data transmitted locally through a gain attenuator (11) and a retarder (12).

3. Device according to claim 2, wherein the data to be received discriminated by the differential amplifier flows through a reception circuit comprising a hysterisis comparator (9) able to reconstitute the binary states of the message received (REC-F).

4. Device according to claim 3, wherein the reception circuit moreover comprises means of regeneration of the clock (10) of the message received.

5. Device according to claim 1, wherein the data transmitted locally flow through a transmission comprising a high-pass filter (6) receiving the data to transmit the form of a binary al and adapted to ensure a zero average component to these data.

6. Device according to claim 1, wherein the data transmitted locally flow through a transmission path comprising a resistance (8) of value equal to the characteristic impedance of the electrical line.

7. Device according to claim 1, wherein the data transmitted locally flow through a transmission path comprising a voltage/current converter (14) having a quasi-infinite output resistance.

8. Device according to one of claims 1 and 2 to 7, wherein the transmission/reception means are configured to transmit data in baseband according to NRZ coding.

9. Device according to one of claims 1 and 2 to 7, wherein the transmission/reception means are configured to implement scrambling and self-correcting functions.

10. Device according to claim 1, wherein the transmission/reception means (3) are configured to transmit data (OC1, OC2, OC3) for the attention of a remote peripheral ($P_1$-$P_N$) in a time interval dedicated to the peripheral.

11. Device according to the claim 10, wherein the transmission/reception means are configured to receive data (RC1, RC2, RC3) coming from a remote peripheral ($P_1$-$P_N$) in the same time interval as that dedicated for retransmission of data (OC1, OC2, OC3) for the attention of said remote peripheral.

12. Device forming a remote peripheral ($P_1$-$P_N$) intended to be linked to a central controller (C) by way of an electrical power line (L) of an avionic system, comprising a power receiver (2) and a low-pass filter ($C_{P1-BF}$) arranged between the power receiver and the electrical line, characterised in that it comprises means of transmitting/receiving data (4) in baseband and a high-pass filter ($C_{P1-HF}$) arranged between the data transmission/reception means and the electrical line, the electrical line being of the kind mutualized for the transmission of power at low frequency from the central controller to the remote peripheral and for the simultaneous bidirectional transmission of data in baseband at high frequency between the central controller and the remote peripheral, the data transmission/reception means (3, 4) comprising a differential amplifier (5) able to discriminate, among the data transiting on the electrical line, the data transmitted locally (EM) from the data to be received (REC).

13. Device according to claim 12, wherein the transmission/reception means (4) are configured to receive data (OC1, OC2, OC3) coming from a central controller (C) in a time interval dedicated by the central controller to the peripheral.

14. Device according to claim 13, wherein the transmission/reception means are configured to transmit data (RC1, RC2, RC3) for the attention of the central controller in the same time interval as that dedicated for the reception of data (OC1, OC2, OC3) from said central controller.

15. Device according to claim 12, wherein the amplifier receives on the one hand the data transiting on the line through a transformer (13) and on the other hand the data transmitted locally through a gain attenuator (11) and a retarder (12).

16. Device according to claim 15, wherein the data to be received discriminated by the differential amplifier flows through a reception circuit comprising a hysterisis comparator (9) able to reconstitute the binary states of the message received (REC-F).

17. Device according to claim 16, wherein the reception circuit moreover comprises means of regeneration of the clock (10) of the message received.

18. Device according to claim 12, wherein the data transmitted locally flow through a transmission path comprising a high-pass filter (6) receiving the data to transmit in the form of a binary signal and adapted to ensure a zero average component to these data.

19. Device according to one of claims 12 to 16, wherein the transmission/reception means are configured to transmit the data in baseband according to NRZ coding.

20. Device according to one of claims 12 to 16, wherein the transmission/reception means are configured to implement scrambling and self-correcting functions.

21. Avionic system comprising a device forming a central controller (C) intended to be linked to a remote peripheral ($P_1$-$P_N$) by way of an electrical power line (L), comprising a power transmitter (1) and a low-pass filter ($C_{C-BF}$) arranged between the power transmitter and the electrical line, as well as characterised in that it comprises means for transmitting/receiving data (3) in baseband and a high-pass filter ($C_{C-HF}$) arranged between the data transmission/reception means and the electrical line, the electrical line being of the kind mutualized for the transmission of power at low frequency from the central controller to the remote peripheral and for simultaneous bidirectional transmission of data in baseband at high frequency between the central controller and the remote peripheral, the data transmission/reception means (3, 4) comprising a differential amplifier (5) able to discriminate, among the data transiting on the electrical line, the data transmitted locally (EM) from the data to be received (REC) linked by way of an electrical power line (L) to one or more devices forming a remote peripheral ($P_1$-$P_N$) intended to be linked to a central controller (C) by way of an electrical power line (L)

of an avionic system, comprising a power receiver (2) and a low-pass filter ($C_{P1\text{-}BF}$) arranged between the power receiver and the electrical line, characterised in that it comprises means of transmitting/receiving data (4) in baseband and a high-pass filter ($C_{P1\text{-}HF}$) arranged between the data transmission/reception means and the electrical line, the electrical line being of the kind mutualized for the transmission of power at low frequency from the central controller to the remote peripheral and for the simultaneous bidirectional transmission of data in baseband at high frequency between the central controller and the remote peripheral, the data transmission/reception means (3, 4) comprising a differential amplifier (5) able to discriminate, among the data transiting on the electrical line, the data transmitted locally (EM) from data to be received (REC).

* * * * *

UNITED STATES PATENT AND TRADEMARK OFFICE
CERTIFICATE OF CORRECTION

PATENT NO.        : 8,537,727 B2                                           Page 1 of 1
APPLICATION NO.   : 13/123893
DATED             : September 17, 2013
INVENTOR(S)       : Francois Guillot et al.

It is certified that error appears in the above-identified patent and that said Letters Patent is hereby corrected as shown below:

In the Claims

Column 9, Claim 5, line 39, please delete "transmission" and insert --transmission path--.

Column 9, Claim 5, line 40, please delete "transmit the" and insert --transmit in the--.

Column 9, Claim 5, line 41, please delete "binary al" and insert --binary signal--.

Signed and Sealed this
Twenty-fourth Day of June, 2014

Michelle K. Lee
*Deputy Director of the United States Patent and Trademark Office*